W. MILLER.
Elevator.
No. 2,003. Reissued June 20, 1865.
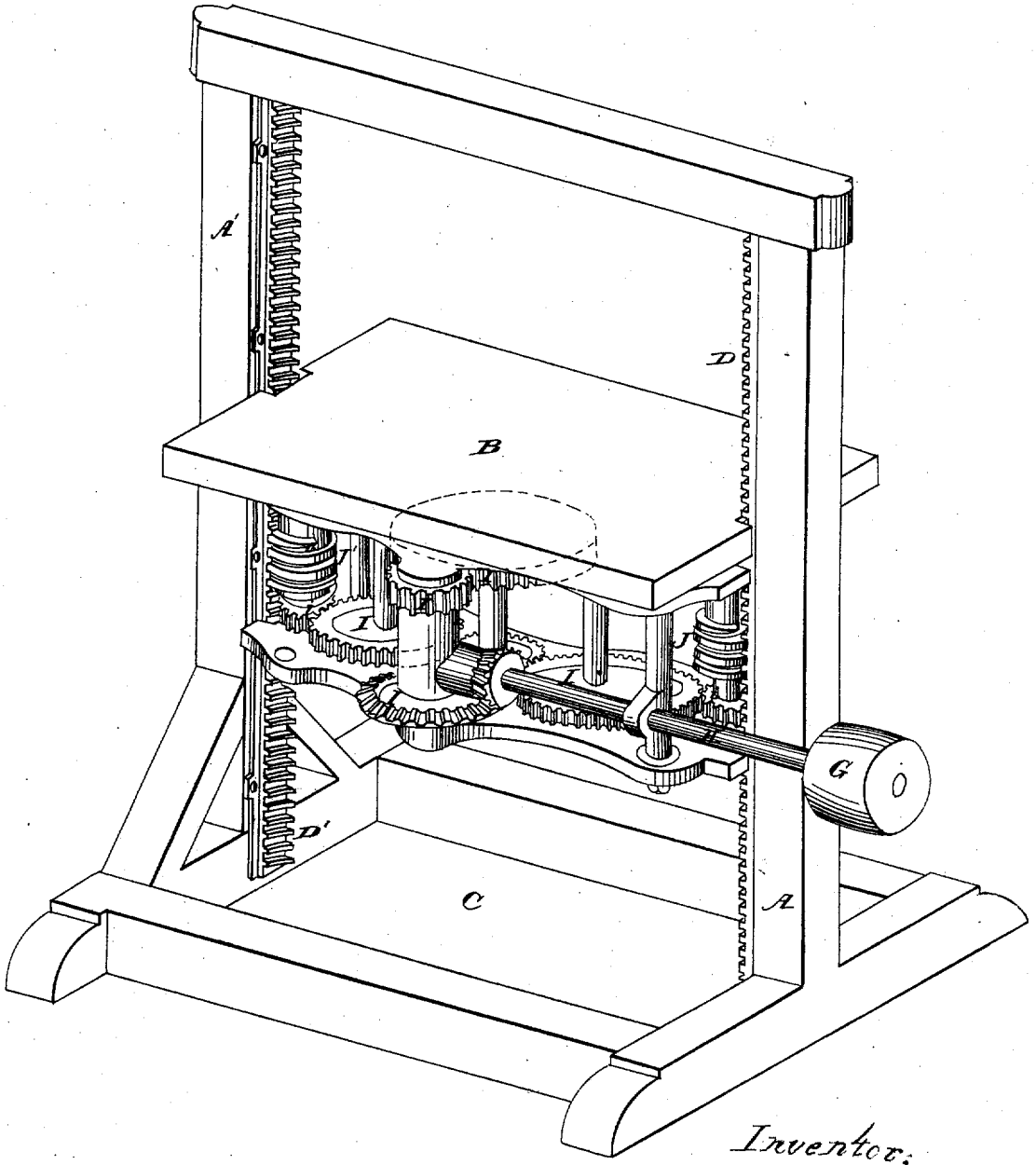
Witnesses;
James H. Layman
C. L. Fisher
Inventor;
W. Miller
By Knight Bros
Attys
N. PETERS, PHOTO-LITHOGRAPHER, WASHINGTON, D. C.

UNITED STATES PATENT OFFICE.

WILLIAM MILLER, OF CINCINNATI, OHIO.

IMPROVEMENT IN HOISTING-MACHINES.

Specification forming part of Letters Patent No. 38,497, dated May 12, 1863; Reissue No. 2,003, dated June 20, 1865.

*To all whom it may concern:*

Be it known that I, WILLIAM MILLER, of Cincinnati, Hamilton county, Ohio, have invented a new and useful Improvement in Hoisting-Machines or Elevators; and I do hereby declare the following to be a full, clear, and exact description thereof, reference being had to the accompanying drawings, making part of this specification.

My improvement relates to a form of actuating mechanism for a hoisting-platform, adapted to act with greater security and efficiency than those heretofore in use.

The accompanying illustration of my invention represents a hoisting-platform adapted for ordinary warehouse purposes.

A A′ represent two stout stanchions, secured on opposite sides of the hatchway, and extending from the lowest to the highest floor with which it is desired to communicate. B is the platform. C is one of the hatchways or floor-openings through which the platform ascends and descends. D D′ are two worm-racks or segmental nuts, attached to the sides of the stanchions A A′ which face the hatchway. J J′ are two precisely-similar worm-wheels, which are journaled vertically to and beneath the platform, and mesh or engage with the worm-racks D D′.

The worm-wheels J J′ are simultaneously and equally rotated by any suitable gearing or mechanism. For this purpose the wheels J and J′ may be provided with pinions *j* and *j′*, connected by gearing I with a drive-shaft, H, which is journaled horizontally to the platform. The drive shaft H may be provided with a pulley, G, for the application of an endless belt, which belt may be passed around a drive-pulley below and an idler above, or vice versa, in the mode common to this class of devices; or the intermediate gearing, I *j j′*, may be replaced by worm-wheels upon the drive-shaft H, meshing into worm-pinions on the shafts of the wheels J J′, while the pulley G on the drive-shaft may be replaced by a bevel-pinion driven by a corresponding pinion adapted to rotate with, while capable of traveling along, a feathered or angular shaft extending vertically throughout the building.

For great strength each worm-wheel may mesh into two worm-racks, embracing it on opposite sides; or, where a single rack is employed for each wheel, the said rack may have its working face coincident with an arc of a greater or less number of degrees, while the worm-wheels themselves may consist of any desired number of threads.

A firm support is secured for the platform, and all tendency of the worm-wheels and the worm-racks to separate or spread apart is prevented by forming the bearing-surfaces of the threads perfectly horizontal in the planes of their axes.

This invention may be adapted for loading and unloading a vessel by extending the stanchions sufficiently into the hold and suspending the platform the height of a man above the operative mechanism instead of supporting the platform above it, as in the illustration.

The improvement is also applicable to various other purposes, such as elevating ore from mines and lifting cars, locomotives, and other heavy objects from one level to another.

The machine may be driven by either manual or other power.

The worm-wheel and worm-rack are obviously better adapted to the purposes of elevating persons and heavy merchandise, and vastly superior in point of security to the common rack and pinion, because each worm-wheel may have any number of constantly-bearing threads, while each thread may have a complete and equal surface bearing from point to heel at right angles to the pressure, whereas a common pinion, being capable of bearing only by one or two cogs at a time, and part of the time on points alone, and in unequal, constantly-changing, and oblique directions, is liable either to "strip" or to force apart the racks, and thus to let the entire platform down by the run.

Another valuable feature of my invention is seen in the fact that a cessation of power leaves the platform perfectly stationary at the very place of elevation or depression without the necessity of any special safety or detaining mechanism—such as pawls or catches—which can act only by the partial descent of the platform, and which, from their liability to derangement, often fail to act at the critical moment, and result in serious and fatal casualties.

I claim herein as new and of my invention—

1. Combining with the platform of a hoisting-machine or elevator a worm-wheel, J, gearing with a corresponding worm-rack, D, substantially as set forth.

2. In combination with the described or equivalent actuating mechanism H I *j* *j'* and platform B, the arrangement of the worm-racks D D′ and worm-wheels J J′, the whole being combined and operating substantially as set forth.

In testimony of which invention I hereunto set my hand.

WILLIAM MILLER.

Witnesses:
GEO. H. KNIGHT,
JAMES H. LAYMAN.